United States Patent [19]

Hagen et al.

[11] Patent Number: 5,387,036
[45] Date of Patent: Feb. 7, 1995

[54] ORGANIC MATERIAL COMPOSTING SYSTEM

[75] Inventors: Daniel J. Hagen; Charles Olsen, both of Stratham, N.H.; Norman J. Blais, Fiskdale; Clifford E. Nelson, Holden, both of Mass.

[73] Assignee: International Process Systems. Inc., Hampton, N.H.

[21] Appl. No.: 923,265

[22] Filed: Jul. 31, 1992

[51] Int. Cl.⁶ .............................................. B01F 15/00
[52] U.S. Cl. ..................................... 366/346; 366/345
[58] Field of Search ............... 366/345, 346, 261, 271; 241/33, 36, 101.2

[56] References Cited

U.S. PATENT DOCUMENTS

| | | | |
|---|---|---|---|
| 1,827,358 | 10/1931 | Giletti | 366/346 |
| 3,181,800 | 5/1965 | Noren et al. | 241/36 |
| 3,341,134 | 9/1967 | Meloy | 241/33 |
| 3,369,797 | 2/1968 | Cobey . | |
| 3,733,033 | 5/1973 | Cobey . | |
| 3,776,528 | 12/1973 | Toto . | |
| 3,856,276 | 12/1974 | Pannell . | |
| 4,290,703 | 9/1981 | Roman . | |
| 4,377,258 | 3/1983 | Kipp, Jr. | 366/345 |
| 4,396,292 | 8/1983 | Roman . | |
| 4,397,674 | 8/1983 | Laughbaum . | |
| 4,413,684 | 11/1983 | Duncklee . | |
| 4,457,630 | 7/1984 | Pannell . | |
| 4,650,128 | 3/1987 | Goldhammer | 241/36 |
| 4,702,609 | 10/1987 | Houle | 366/271 |
| 4,813,615 | 3/1989 | Hösel et al. | 241/33 |
| 4,828,399 | 5/1989 | Pacentino et al. . | |
| 4,869,877 | 9/1989 | Sellew et al. . | |
| 5,149,196 | 9/1992 | Piacentino et al. | 366/345 |
| 5,187,097 | 2/1993 | Weber et al. . | |

FOREIGN PATENT DOCUMENTS

| | | | |
|---|---|---|---|
| 0184144 | 12/1955 | Austria | 366/346 |
| 0069897 | 1/1983 | Germany . | |
| 0250617 | 6/1986 | Germany . | |
| 0393378 | 10/1990 | Germany . | |
| 0423514 | 9/1991 | Germany . | |

Primary Examiner—David A. Scherbel
Assistant Examiner—James F. Hook
Attorney, Agent, or Firm—Allegretti & Witcoff, Ltd.

[57] ABSTRACT

Method, system and apparatus are disclosed for in-vessel composting of organic material. A compost handling apparatus moves forwardly through a bed of composting material in an elongate open bay. Specifically, an agitator comprises a feed belt such as a transversely mounted cylindrical drum, which feeds composting material to a conveyor which lifts the material and projects it rearwardly behind the agitator. A regulator, such as an adjustable deflector, controls the discharge of composting material by the conveyor. The deflector is adjusted as the agitator moves forward through the composting material to develop a level bed in the bay behind the agitator. A sensor may be employed to generate a depth signal corresponding to the depth of the composting material for controlling the deflector.

15 Claims, 3 Drawing Sheets

ORGANIC MATERIAL COMPOSTING SYSTEM

INTRODUCTION

The present invention is directed to an in-vessel method, system and apparatus for composting material, such as municipal and/or industrial sludges and so-called green stream materials.

BACKGROUND OF THE INVENTION

Composting is well recognized as an environmentally sound and economical means of recycling a variety of organic materials, and is increasingly becoming an important part of municipal and industrial solid waste management programs. Various composting technologies are available or are being developed, including static pile composting, windrow composting, aerated-windrow composting, and in-vessel composting employing, for example, circular reactors, horizontal agitated bay or bin reactors and vertical reactors.

In all such systems there is need for cost effectiveness, including especially capital cost and operating cost effectiveness, and suitability for automation. Regarding capital costs, reducing the space required for a given throughput of composting material is a well recognized need in the industry. Composting operations employing windrows, for example, are thought to have a disadvantageously low ratio of composting material throughput to processing area square footage. While in vertical and closed reactors, compost material may typically be mounded 20-30 feet high, technical difficulties have been experienced involving the adequacy of aeration, leading in some cases to the composting process becoming anaerobic.

So called in-vessel composting operations, particularly those suitable for use in an enclosure building for sound and odor control, have been used with excellent results. A particularly advantageous system of this type, presently used and marketed by International Process Systems, Inc., a Wheelabrator Clean Water Company, and often referred to as the IPS Agitated Multi-Bay Composting System, employs automated agitators to thoroughly mix and aerate composting material in parallel bays. Starting at the discharge end of an open, elongate composting bay, the agitator moves through the bed of composting material toward the front, loading end of the bay. Typically, the agitator travels through each bay daily, mixing the material and rearwardly displacing it, i.e., moving it a given distance down the bay from the loading end toward the discharge end of the bay. Material typically is displaced a constant, fixed distance (often about 12 feet) down the bay with each pass, thus discharging finished material at the discharge end and creating space for a new load of organic material at the loading end with each pass. An agitator of this type and its use in an IPS agitated bay composting system is described in U.S. Pat. No. 4,828,399 to Pacentino et al, assigned to International Process Systems, Inc., that description being incorporated herein by reference.

Typically, the moisture content and the volatile content of composting material decreases during the composting operation. That is, as recognized by those skilled in the art, moisture loss and volatile solids content loss from the composting material during the composting process results in a reduction in volume of the composting material. Shrinkage in height of a uniform width "rick" of mushroom compost is said to be 30 to 40% in U.S. Pat. No. 3,776,528. While a somewhat randomly irregular bed height is shown in the illustrated portion of the composting bays in FIG. 18 of aforementioned U.S. Pat. No. 4,828,399, the beds would, in fact, have progressively less height from the tip-in end to the discharge end. This is a natural consequence of the composting material's loss of volume and the substantially uniform distance of rearward displacement of the composting material with each pass of the agitator through the bed of compost material in the bay.

In fact, in a typical IPS agitated bay composting system, solids content of the composting material starts at about 30%-50%, most often between 38% and 42%, and finishes at the discharge end of the bay with a solids content of about 50%-90% after an 18-24 day composting period. Consequently, the depth of the composting material bed in the bay may drop, for example, from about 5 feet at the receiving end of the bay to about 3 feet at the discharge end.

The open volume of the bay above the composting material represents an opportunity for improved efficiency of the system. The same amount of composting material could be contained in a shorter bay if the full design depth of the bay was utilized along its entire length. Shorter bays could be constructed at lower capital costs. In addition, they would require less land space or, alternatively, more bays could be placed within a given area. In addition, the agitator could process a larger number of bays, since it would pass through a shorter bay in less time. The same result is not achieved simply by loading additional material at the loading end of the bay, since material is loaded already to the full depth of the bay at that end. Also, the composting material may not simply be moved more quickly through the bay to fill the additional volume toward the discharge end, since residence time in the bay is dictated by the requirements of the composting process.

Various compost handling machines have added fixed or adjustable bed height limiters in an effort to produce a bed of more uniform height. Moveable side and top plates are suggested for forming so called stacking gates in the composting machine of U.S. Pat. No. 3,856,276 and U.S. Pat. No. 4,457,630, both issued to Pannell. Similarly, in aforesaid U.S. Pat. No. 3,776,528 to Toto, a composting machine has a trailing buffer which is adjusted to scrape over the rick of discharged material, pushing a wave of excess material before it. Such devices resist a compost bed exceeding a given height, but do not produce a bed which maintains a full bay depth. As noted above, in an in-vessel composting operation, use of the entire available design depth along the length of a bay could enable a given amount of material to be composted in a shorter bay without reduction in process retention time.

SUMMARY OF THE INVENTION

In accordance with the present invention, in-vessel composting methods, systems and apparatus are provided. The invention is applicable to the composting of a wide variety of materials, for example, organic wastes, including municipal sewage sludge and solid waste, yard wastes, paper and magazines as well as a number of industrial, commercial and agricultural wastes. According to a first aspect, an agitator is provided for travelling through a bed of organic composting material in an elongate bay for aerating and rearwardly displacing the composting material in the bay. The agitator comprises conveyor means to transport and discharge composting material behind the agitator as it progresses through the bed in the bay. The conveyor means comprises a driven, compost material carrying means, for example, a set of transverse, flights pulled up and over an inclined plate. A feed means mounted forward of the conveyor means, comprising for example a rotating toothed drum or the like, takes composting material from the bed forward of the agitator and feeds it rearwardly to the conveyor means. Adjustable composting material discharge regulating means is provided for regulating rearward displacement of the composting material discharged by the conveyor means. The regulating means comprises a moveable member which can act on the material as it is being rearwardly discharged by the conveyor means, such that the rearward displacement of the composting material is selectively increasable and decreasable by adjusting the position of the moveable member as the agitator progresses in the bay to produce a substantially level bed of composting material in the bay behind the agitator.

It is a significant feature and advantage of the present invention that a level bed of composting material behind the agitator can be produced to utilize the full design volume of the bay. Typically, to accomplish this end, the moveable member of the regulator means is positioned such that material at the discharge end of the bay, when the agitator begins its travel through the bed of composting material, is discharged a shorter distance, since it has been reduced in volume by loss of moisture content and volatile solids content as discussed above. As the agitator progresses through the bay, the moveable member is continuously or repeatedly repositioned such that the distance of rearward displacement of composting material is gradually increased to accommodate composting material which has had progressively less residence time in the bay and accordingly has experienced less reduction in volume. In accordance with preferred embodiments, irregularities in the bed depth (which may have developed for reasons other than gradual moisture loss) also can be leveled as the agitator passes through the bed.

Significant advantages in composting operations can be achieved through the use of certain preferred embodiments. One highly significant advantage of the variable discharge displacement provided by the regulator means of the agitator for level bed development is the shorter bay length required to handle a given throughput of composting material. Facilities having shorter composting bays require less land and smaller enclosure buildings, and can be correspondingly less expensive to build and operate. The capital and operating costs of associated ventilation and odor control systems can also be reduced. In a typical IPS Agitated Multi-Bay Composting System having the above disclosed variable discharge displacement feature for developing level composting beds, the bays may be substantially shorter. A single agitator could serve more bays, in view of the shorter length to be traversed each day. This can significantly further reduce capital and operating costs for the system. Additional features and advantages will be understood by those skilled in the art from the following detailed description of certain preferred embodiments.

BRIEF DESCRIPTION OF THE DRAWINGS

The following detailed description refers to the accompanying drawings wherein.

DETAILED DESCRIPTION OF CERTAIN PREFERRED EMBODIMENTS

It should be understood that directional terms employed are for ease of reference. The agitator will be described as moving forwardly through the bed of composting material in the composting bay, generally meaning from the discharge end to the receiving end of the bay. Thus, the first composting material encountered by the agitator at the discharge end of the bay is displaced rearwardly from the bay, the in-vessel composting portion of the operation having been substantially completed for that portion of the bed. At the receiving end of the bay the agitator displaces the most recently received material rearwardly, thereby making space available in the bay for receiving fresh composting material. The term traverse is used to mean extending laterally (from side wall to side wall) generally horizontally perpendicular to the longitudinal direction of travel of the agitator in the bay. The terms bed depth and bed height are use interchangeably.

Figure 1:
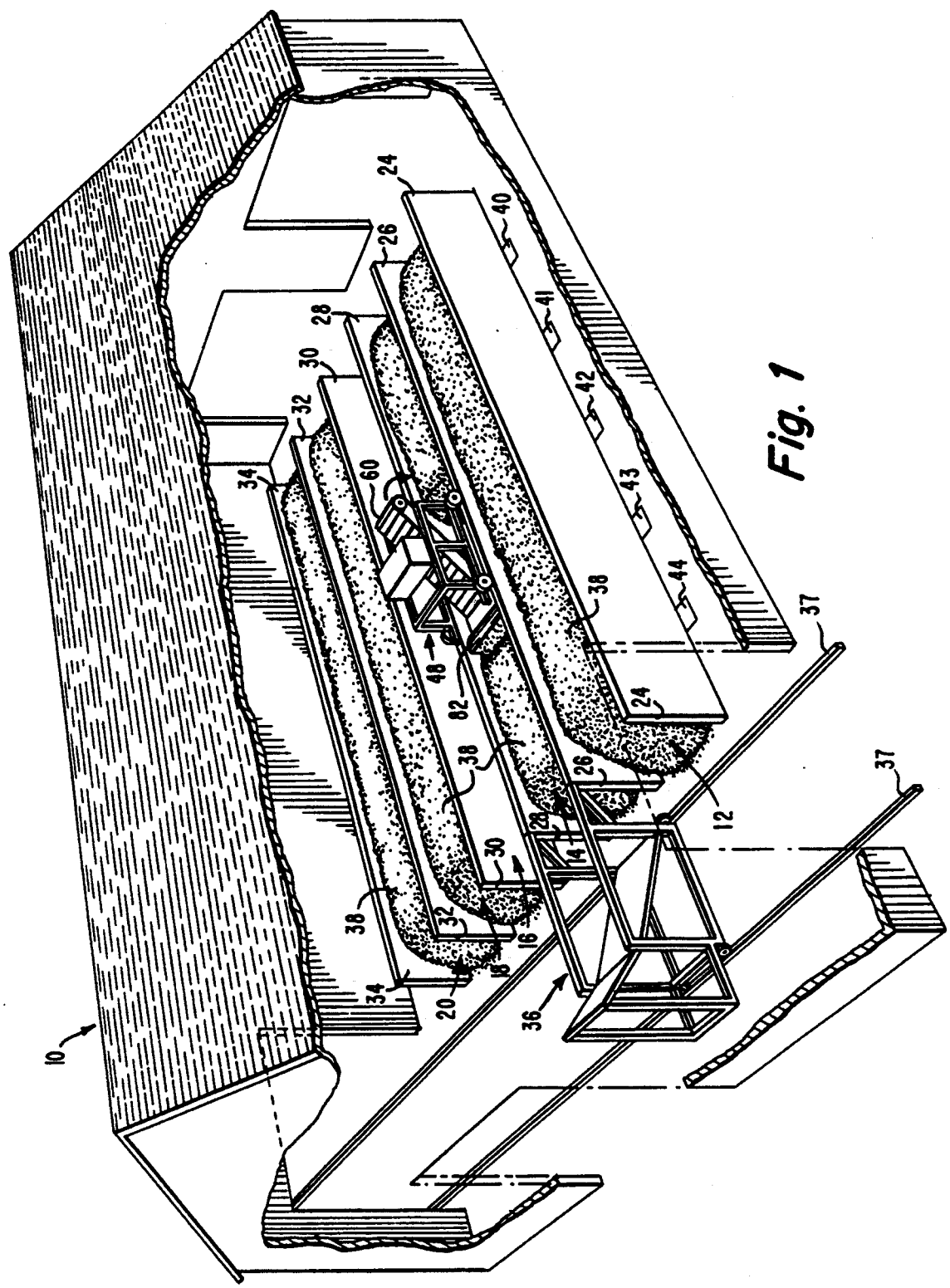
FIG. 1 is a perspective view of a level bed in-vessel composting system in accordance with one preferred embodiment of the present invention.
Figure 2:
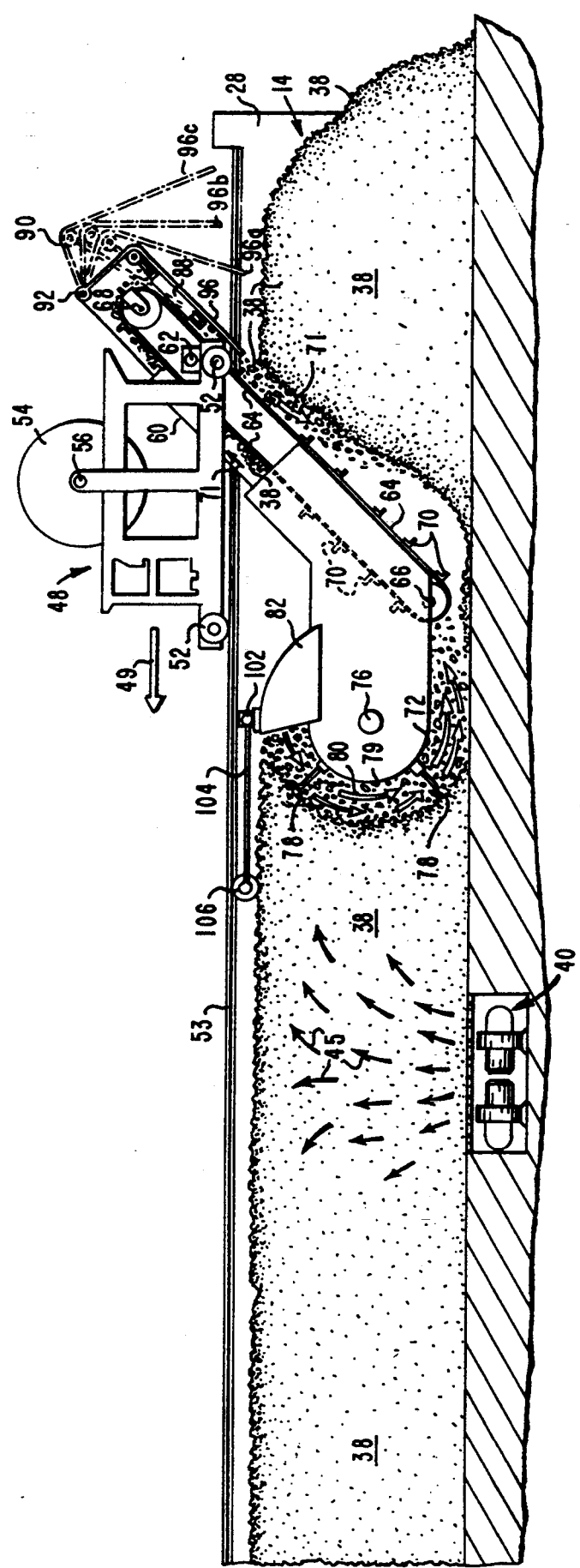
FIGS. 2 and 3 are enlarged side elevation views of the agitator in the system illustrated in FIG. 1.
Figure 3:
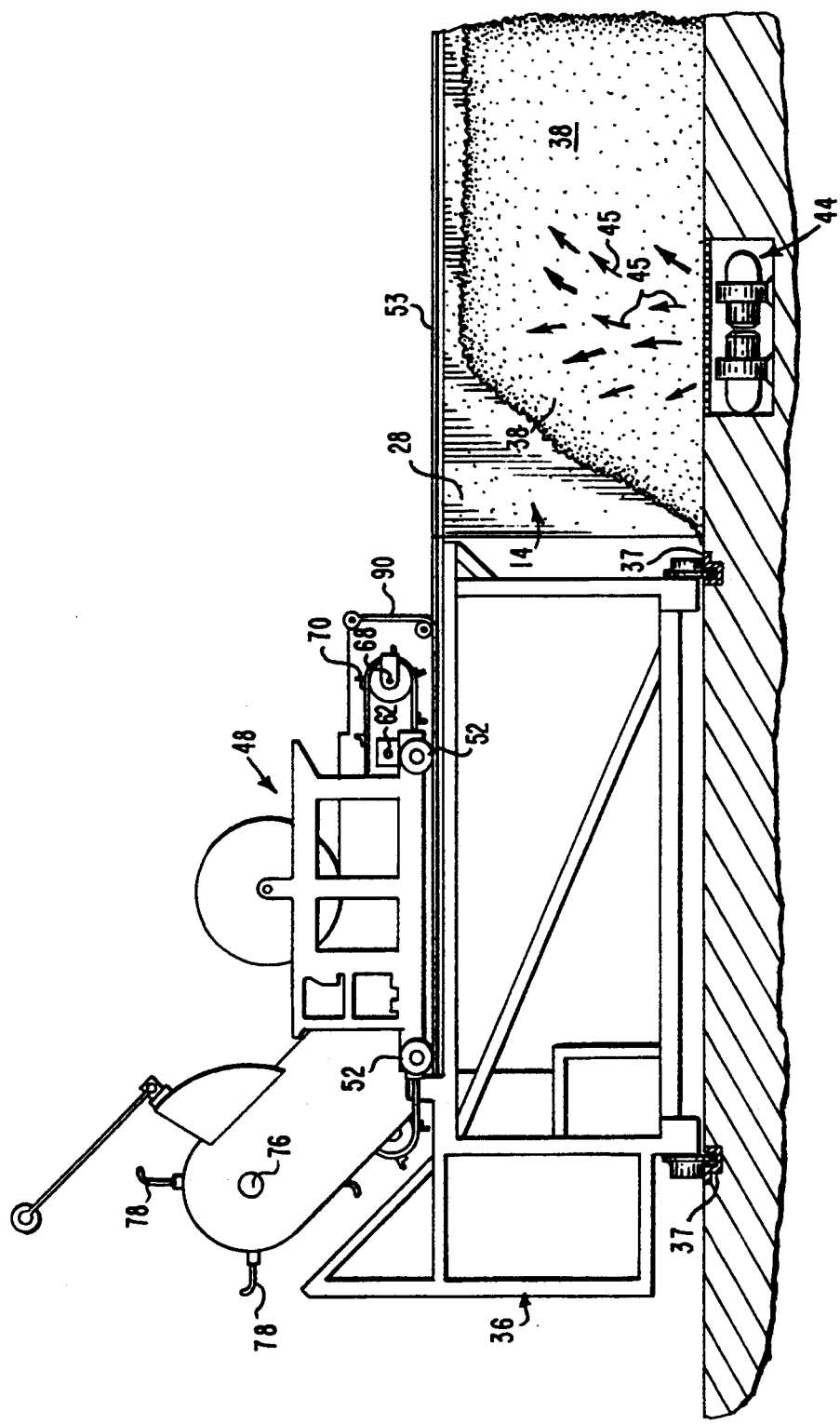

While the agitator of the invention and the variable displacement discharge provided by the regulator means of the agitator can be employed in a variety of application within the scope of the present invention, the preferred embodiments described in greater detail below are highly advantageous application in accordance with the IPS Agitated MultiBay Composting Systems. Thus, such preferred embodiments are modular, the basic module being an open horizontal bay, usually about 6 to 12 feet wide, preferably 6-feet wide, 6 to 9 feet high, preferably 6-feet high, and 100 to 250 feet long, preferably 125 to 200 feet long. A plurality of open bays can be placed side-by-side and served by a single agitator, since a pass of the agitator through the bay typically requires only about 1 to 2 hours. The system can be used to compost a wide variety of materials and the rate of composting can be regulated to meet varying levels of demand. The open bays are readily enclosed within a building from which air can be exhausted directly to the atmosphere or through odor-controlling biofilters, chemical scrubbers or other means of odor control. Referring now to FIGS. 1 to 3, an in-vessel composting system is shown within a schematically illustrated enclosure building 10. The system comprises multiple adjacent, parallel composting bays 12–20. The bays are formed by parallel upstanding concrete walls 24–34. Other suitable bay forming means will be readily apparent to those skilled in the art in view of the present disclosure. A bed of composting material 38 in each bay is seen to have a substantially uniform depth. Typically, a bed depth of about 5 feet would be maintained in a 6 foot high composting bay.

In a typical composting operation in accordance with the present invention, the solids content of the composting material generally will start at the receiving end of the bay at about 30%–45%, more preferably 38%–42%, most preferably about 40%. The solids content preferably will have increased by the discharge end of the bay to between 50% and 90%. As disclosed above and further discussed below, the height of the compost bed in the bay is maintained at a uniform level in accordance with the present invention notwithstanding the loss of moisture resulting in such decreased moisture content. Composting material in such composting operations typically is resident in the composting bay approximately 18-24 days. Those skilled in the art will recognize that material discharged from the bay may require finished product curing. Material loaded into the composting bay also may be pretreated. Yard waste such as tree branches, for example, may be reduced in size to about 0.75 to 3.0 inches by means of a chopper/shredder, etc. Post processing may include screening to remove wood chips or other larger sized components of the material, which can be recycled. The composting material also may be retained on-site for extended periods. In cold winter areas, for example, finished composting material suitable for use as a soil amendment or the like may be retained on the composting site during winter months when demand for such material is lower. Of course, those skilled in the art are aware of alternative types of beneficial re-use of the finished product of the composting operation.

Low power blowers 40-44 at spaced locations along the bays force air 45 up through the compost bed. Typically, a bay has multiple, for example, three to six, aeration zones, temperature sensors and computer control feedback (I/O) response system, to maintain aerobic conditions and control composting temperatures. Recessed temperature sensors may be used. Suitable such sensors are known to those skilled in the art. During approximately the first 7 days of composting, including at least three consecutive days, the temperature preferably is maintained from 55°-60° C. for pathogen destruction. The temperature in later portions of the bed (that is, closer to the discharge end of the bay) generally is preferably maintained at temperatures below 55° C., preferably about 40°-45° C., for good bacteria efficiency in the composting process. Of course, those skilled in the art will recognize that the particular temperature program, moisture content, residence time, etc. may be dictated by the particular composting operation and materials, and by applicable local, state and/or federal guidelines.

The level bed agitator 48, shown in enlarged side elevation in FIGS. 2 and 3, comprises a main frame 50 adapted to ride on wheels 52 on rails 53 on the bay walls over the top of the composting bed as the agitator services the composting bed. The agitator travels in the direction of arrow 49 as it services the composting bed. Main frame 50 has power receiving means for operating the agitator, including preferably a power cable reel 54 which employs a hydraulic motor or like means to collect a power cable providing power to the agitator as it progresses toward the loading end of the bay. For this purpose, power cable reel 54 is rotatably mounted about a traverse axis by pinions 56.

The agitator further comprises a conveyor subassembly 60 pivotably mounted to the main frame 50 at transversely spaced pinions 62. In FIG. 2 the conveyor subassembly 60 is shown in its normal operating position, preferably, at approximately a 45° to 55° angle from horizontal. Preferably, lifting means are provided to lift the conveyor subassembly to a horizontal position, along with the feed drum mounted thereto, in preparing the agitator to be laterally (further discussed below) shuttled to the next bay and then moving the agitator to the discharge end of that next bay where it is again lowered to begin treatment of the composting bed therein. In FIG. 3 the agitator is shown mounted in lifting and shuttle means 36 which can carry the agitator laterally from bay to bay on rails 37.

In the preferred embodiment illustrated in FIG. 2, the conveyor subassembly has an inclined plate 64 which extends upwardly and rearwardly from a lower return 66 to an upper return 68 above the bay walls. The plate 64 is substantially the fully width of the bay. In a typical commercial embodiment, the length of the conveyor from lower return 66 to upper return 68 is approximately 10 feet to 13.5 feet, for example about 13 feet 4 inches. A set of transversely extending flights 70, (for simplicity, only two flights are illustrated in FIG. 2) extend transversely substantially equal in width to plate 64, being connected at opposite ends to spaced locations along a pair of endless drive lines, preferably chains, driven over the upper and lower returns. Typically, the flights are spaced from each other approximately one foot. In the preferred embodiment illustrated, the flights travel upwardly in the direction of arrows 71 over inclined plate 64 on the forward side of subassembly 60. The flights push composting material upwardly over the inclined plate 64 and discharge the same rearwardly airborne at the top of the conveyor subassembly before returning down the back side of the conveyor subassembly. Generally, the conveyor subassembly is run at about 50-60 rpm, although it is well within the ability of those skilled in the art to select a suitable speed adapted to particular composting operations. Alternative conveyor means for carrying composting materials will be readily apparent to those skilled in the art in view of the present disclosure, including endless conveyor belts, augers, etc.

The conveyor subassembly receives composting material from the feed or agitator drum 72. Accordingly, the lower return 66 of the conveyor subassembly is located in close proximity thereto. The agitator drum 72 is mounted to a drum frame 74 carried by the conveyor subassembly 60. In the preferred embodiment illustrated, the drum frame 74 comprises a pair of laterally spaced steel plate frame members on opposite sides of the conveyor subassembly. The agitator drum is mounted to the drum frame transversely, i.e., for rotation about a horizontal drum axis 76 perpendicular to the direction of travel in the bay. Optionally, means are provided for clearing the lower bay walls. For example, scraper bars may be mounted to the agitator drum axle ends outside the plate steel frame members for rotation proximate the lower ½ of the bay walls as the agitator moves forward. Similar scraper bars may be mounted to the outside ends of the lower mounting shaft of the conveyor.

The agitator drum has outwardly extending teeth 78 for shearing into the bed of composting material in front of the agitator. The outwardly extending teeth 78 are spaced over outside circumferential drum surface 79. The agitator drum 72 rotates preferably in the direction of arrow 80. In a typical commercial composting operation, the drum would rotate at a rate of approximately 75 rpm, although it will be within the ability of those skilled in the art to select a suitable rate of rotation for a given composting operation.

Rotation of the agitator drum 72 feeds composting material to the conveyor subassembly 60. Accordingly, the agitator drum preferably is substantially laterally coextensive with the conveyor subassembly and, thus, preferably extends laterally almost the full width of the bay. The agitator drum rotates within partial drum housing 82, which aids in controlling the flow of composting material and in the control of dust.

In accordance with a significant aspect of the preferred embodiment illustrated in FIG. 2, the adjustable composting material discharge regulating means of the agitator for regulating rearward displacement of the composting material by the conveyor subassembly comprises a generally L-shaped discharge shroud 90 substantially laterally coextensive with the inclined plate 64. The discharge shroud is pivotably mounted about transverse pivot shaft 92 defining a horizontal shroud axis substantially parallel to the drum axis 76. Discharge shroud 90 is spaced from the flights 70 as they pass over the upper return 68 sufficiently to allow composting material to pass below it. As illustrated, discharge shroud 90 has an upper portion 94 at least partially covering the upper portion of the conveyor subassembly, and a rearward portion 96 extending from the upper portion behind the conveyor means.

The position of the discharge shroud is adjustable about the shroud axis as the agitator progresses through the composting bed in the bay. More specifically, the discharge shroud 90 is moveable between a close position and a full open position. In the close position (illustrated in solid lines) the rearward portion extends downwardly and forward to direct composting material forward of the upper return 68. In progressively more open positions 96a–96c the rearward portion extends ever more rearwardly. Preferably, in the full open position the rearward portion 96 of the discharge shroud 90 does not significantly interfere with the rearward projection of composting material by the conveyor subassembly. Typically, full rearward airborne displacement is about 12 to 14 feet. The discharge shroud preferably moves through an arc of approximately 32°, actuated by hydraulic cylinders of approximately 10–16 inch stroke for agitators in accordance with the preferred embodiment herein described. In a typical commercial version, the shroud in the close position causes composting material to fall forward of the upper return. Preferably the rearward portion of the shroud extends to a sufficient length to limit rearward displacement (measured from the original position in the composting bed prior to the agitator pass) to be as little as about 7 feet, for example, 7 feet 2 inches.

Alternative suitable discharge regulating means for regulating rearward displacement of the composting material by the conveyor subassembly by airborne deflection will be readily apparent to those skilled in the art in view of the foregoing disclosure. Thus, for example, a baffle plate mounted for variable rearward spacing from the top of the conveyor subassembly, a variable sliding deck mounted at the bottom of a reversely rotating conveyor, variable angular disposition about a traverse pivot axis, or both, will enable rearward displacement regulation suitable for certain applications. Similarly, means for varying the angle of the conveyor subassembly or for telescoping the conveyor subassembly etc. will be understood to provide alternatives suitable in particular applications for regulating rearward displacement of the composting material.

Control means preferably are provided for controlling the position of the discharge shroud 90. Numerous suitable alternative control means will be readily apparent to those skilled in the art in view of the present disclosure. In the preferred embodiment illustrated, one or more laterally spaced fluid-powered cylinders 98 are attached at one end to the conveyor subassembly 60 and at the other end to the discharge shroud 90. Preferably, a pair of fluid-powered cylinders are employed at ends of the discharge shroud 90. As used herein, the term fluid-powered cylinder is used to mean, for example, a pneumatically powered cylinder, an hydraulically powered cylinder or the like.

Those skilled in the art will recognize from the foregoing disclosure that adjustment of the position of the discharge shroud as the agitator progresses forwardly will control the location in the bay to which composting material is discharged by the agitator. Starting the discharge shroud in the close position at the discharge end of a composting bay will enable development of a full depth bed at that end of the bay, notwithstanding the decreased volume of the composting material due to moisture or volatile solid loss at that end. Controlling the degree to which the discharge shroud is opened as the agitator progresses forwardly in the bay will similarly maintain development of a level bed behind the agitator. At the receiving end of the bay, at the end of the agitator's pass through the composting bed, the shroud typically will be in the full open position in which it does not substantially interfere with the rearward displacement of composting material by the agitator. Such full rearward displacement is approximately 12 feet in typical commercial composting operations of this type. There will, of course, be decreasing bed depth at the extreme ends of the bay.

The degree to which the discharge shroud is opened can be controlled by suitable control means simply as a function of the forward distance traveled by the agitator in the bay. Either in addition to or in lieu of such control function, sensor means may be provided for sensing the depth of the bed of composting material and generating a bed depth signal corresponding thereto. In such embodiments, the agitator comprises control means preferably adapted to control the position of the discharge shroud at least partially in response to the bed depth signal. Suitable sensors include, for example, a rotatable wheel mounted at the end of a pivotably mounted arm extending forwardly of feed drum 72. The bed depth signal may be generated in such embodiments as a function of the angle of the arm to a reference position. In the preferred embodiment illustrated in FIG. 2, sensor means 102 of this type is illustrated, comprising arm 104 carrying at its forward end a rotatable wheel 106. Arm 104 is pivotably mounted at the top of drum housing 82. The sensor member 106 alternatively may comprise a sonar signal transponder. The sensor means also may employ one or more electric eyes, or the like. Alternative suitable sensor means will be readily apparent to those skilled in the art in view of the present disclosure. In accordance with one particularly preferred embodiment of the invention, the depth of the composting bed is sensed along the length of the bay, this information being used to control the position of the discharge shroud during the next pass of the agitator through the composting bed. With reference to recording the bed depth for the next run, this can be accomplished by simple computer means, preferably on-board the agitator, and is well within the ability of those skilled in the art given the present disclosure.

The reading of the foregoing description of certain preferred embodiments by those skilled in the art will bring to mind various possible alterations and modifications within the spirit and scope of the invention. It is intended that the following claims include all such alterations and modifications within the true scope of the invention.

We claim:

1. An agitator for travelling through a bed of composting material in an elongate bay for aerating and rearwardly displacing the composting material in the bay, comprising:

conveyor means for conveying and rearward airborne discharge of the composting material behind the agitator as it progresses through the bed in the bay;

feed means forward of the conveyor means for taking composting material from the bed forward of the agitator and rearwardly feeding it to the conveyor means; and adjustable composting material discharge regulating means for selectively regulating rearward airborne displacement of the composting material by the agitator, comprising a moveable member rearward of the conveyor means in the path of airborne rearward discharge of the composting material, the moveable member being adjustable to vary airborne deflection of the composting material to selectively increase and decrease its rearward displacement distance as the agitator progresses in the bay to produce a substantially level bed of composting material in the bay behind the agitator.

2. The agitator of claim 1 wherein the moveable member comprises a transversely extending, generally L-shaped discharge shroud pivotably mounted to the agitator, being substantially laterally coextensive with the conveyor means, at least partially covering a top rearward portion of the conveyor means and extending downwardly behind the conveyor means.

3. The agitator of claim 2 wherein the regulating means comprises automatic control means for controlling the position of the discharge shroud relative the conveyor means.

4. The agitator of claim 3 wherein the control means controls is adapted to control the position of the discharge shroud as a function of distance travelled by the agitator in the bay.

5. The agitator of claim 3 further comprising sensor means for sensing the depth of the bed of composting material and generating a bed depth signal corresponding thereto, the control means being adapted to control the position of the discharge shroud at least partially in response to the bed depth signal.

6. The agitator of claim 5 wherein the sensor means comprises a pivotably mounted arm extending forwardly of the agitator, the bed depth signal being generated as a function of an angle of the arm to a reference position.

7. The agitator of claim 5 wherein the sensor means comprises a sonar signal generator.

8. The agitator of claim 3 wherein the control means comprises multiple transversely spaced fluid-powered cylinders, each having a first end attached to the discharge shroud and a second end attached to the conveyor means.

9. An agitator for travelling longitudinally in a forward direction through a bed of organic composting material in an elongate bay to aerate and rearwardly displace the composting material in the bay, comprising:

a main frame adapted to ride over the bed and comprising power receiving means to receive operating power for the agitator;

an agitator drum mounted to a drum frame for rotation about a transverse drum axis, having outwardly extending teeth spaced over an outside circumferential drum surface;

a conveyor subassembly pivotably suspended from the main frame and carrying the drum frame, for receiving composting material from the agitator drum and discharging the composting material rearwardly airborne behind the agitator as it progresses through the bed in the bay, comprising an inclined plate substantially laterally coextensive with the agitator drum and extending upwardly and rearwardly toward an upper return from a lower return in close proximity to the agitator drum, and a set of transversely extending flights attached at opposite ends to spaced locations along a pair of endless drive lines driven over the upper and lower returns;

a transversely generally L-shaped discharge shroud mounted for pivoting about a transverse shroud axis for airborne deflection of the composting material as it is rearwardly discharged by the conveyor subassembly to selectively regulate rearward airborne displacement of the composting material, the discharge shroud being spaced from the flights sufficiently to allow composting material to pass below it and having an upper portion at least partially covering a top rearward portion of the conveyor subassembly, and a rearward portion extending from the upper portion behind the inclined plate, being adjustable about the shroud axis as the agitator progresses in the bay between a close position in which the rearward portion extends downwardly and forward to direct composting material forward of the upper return and an open position in which the rearward portion extends rearwardly; and control means for controlling the position of the discharge shroud.

10. The agitator of claim 9 further comprising sensor means for sensing the depth of the bed of composting material and generating a bed depth signal corresponding thereto, the control means being adapted to control the position of the discharge shroud in response to the bed depth signal.

11. An in-vessel composting system comprising at least one elongate bay extending with substantially constant width and depth from a compost material receiving end to a discharge end, and an agitator for travelling through a bed of composting material in the bay from the discharge end to the receiving end for aerating and rearwardly displacing the composting material in the bay, the agitator comprising:

conveyor means for conveying and rearward airborne discharge of the composting material behind the agitator as it progresses through the bed in the bay comprising at least one driven, transversely extending compost material carrying means member having a width substantially equal to the width of the bay;

feed means transversely mounted forward of the conveyor means, having a width substantially equal to the width of the bay, for rearwardly feeding composting material from the bed forward of the agitator to the conveyor means; and adjustable composting material discharge regulating means for selectively regulating rearward airborne displacement of the composting material by the conveyor means, rearward airborne displacement distance being selectively increasable and decreasable as the agitator progresses in the bay by adjustment of the position of a moveable member in the path of airborne discharge of the composting material, the moveable member having a width substantially equal to the width of the bay, to produce a substantially level bed of composting material in the bay behind the agitator.

12. The in-vessel composting system of claim 11 having multiple said bays parallel and adjacent each other and further comprising shuttle means for lifting and transporting the agitator from one said bay to another.

13. An in-vessel composting method comprising loading a bed of composting material into an elongate bay extending with substantially constant width and depth from a receiving end to a discharge end, and repeatedly passing an agitator through the bed of composting material in the bay from the discharge end to the receiving end for aerating and rearwardly displacing the composting material toward the discharge end, the compost handling apparatus comprising:

conveyor means for conveying and rearward airborne discharge of the composting material behind the agitator as it progresses through the bed in the bay, comprising at least one driven, transversely extending compost material carrying member having a width substantially equal to the width of the bay;

feed means transversely forward of the conveyor means, having a width substantially equal to the width of the bay, for rearwardly feeding composting material from the bed forward of the agitator to the conveyor means; and adjustable composting material discharge regulating means for selectively regulating rearward airborne displacement of the composting material by the conveyor means, rearward airborne displacement distance being selectively increasable and decreasable by adjustment of the position of a moveable member rearward of the conveyor means in the path of rearward airborne discharge of the composting material, the moveable member having a width substantially equal to the width of the bay, to produce a substantially level bed of composting material in the bay behind the agitator.

14. The in-vessel composting method of claim 13 further comprising the step of controlling the position of the moveable member of the regulating means as a function of distance travelled by the compost handling apparatus in the bay.

15. The in-vessel composting method of claim 13 further comprising the step of controlling the position of the moveable member relative to the conveyor means by automatic control means responsive to a bed depth signal, and the agitator further comprises sensor means for sensing the depth of the bed of compost material proximate the agitator and generating the bed depth signal corresponding thereto.

* * * * *